United States Patent
Matula et al.

(10) Patent No.: US 12,423,633 B2
(45) Date of Patent: Sep. 23, 2025

(54) DYNAMIC GENERATION OF CUSTOM POST-CALL WORKFLOW

(71) Applicant: Avaya Management L.P., Durham, NC (US)

(72) Inventors: Valentine C. Matula, Granville, OH (US); Manish Negi, Pune (IN); John H. Meiners, Boulder, CO (US)

(73) Assignee: Avaya Management L.P., Durham, NC (US)

(*) Notice: Subject to any disclaimer, the term of this patent is extended or adjusted under 35 U.S.C. 154(b) by 603 days.

(21) Appl. No.: 17/115,157

(22) Filed: Dec. 8, 2020

(65) Prior Publication Data

US 2022/0180257 A1    Jun. 9, 2022

(51) Int. Cl.
| | |
|---|---|
| *G06Q 10/0633* | (2023.01) |
| *G06N 3/00* | (2023.01) |
| *G06N 3/045* | (2023.01) |
| *G06N 3/08* | (2023.01) |
| *H04M 3/00* | (2024.01) |
| *H04M 3/22* | (2006.01) |

(52) U.S. Cl.
CPC ......... *G06Q 10/0633* (2013.01); *G06N 3/045* (2023.01); *G06N 3/08* (2013.01); *H04M 3/2218* (2013.01)

(58) Field of Classification Search
CPC .................................................. G06Q 10/00
See application file for complete search history.

(56) References Cited

U.S. PATENT DOCUMENTS

| | | | |
|---|---|---|---|
| 8,634,543 B2 | 1/2014 | Flockhart et al. | |
| 8,650,152 B2 | 2/2014 | Dettinger et al. | |
| 9,582,779 B1* | 2/2017 | Bevan | G06Q 10/06316 |
| 10,554,817 B1* | 2/2020 | Sullivan | H04L 41/5054 |
| 11,593,740 B1* | 2/2023 | Chan | G06Q 10/0633 |
| 2003/0233374 A1 | 12/2003 | Spinola et al. | |
| 2008/0005053 A1* | 1/2008 | Pulsipher | G06Q 10/10 706/45 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2016/0247246 A1* | 8/2016 | Bluestone | G06Q 50/265 |
| 2019/0066674 A1* | 2/2019 | Jaygarl | G10L 15/22 |
| 2020/0019233 A1* | 1/2020 | Ikeda | G06F 3/0304 |
| 2021/0029064 A1* | 1/2021 | Higgins | G06N 20/00 |
| 2023/0052691 A1* | 2/2023 | Thiruvenkatanathan | G06F 18/22 |

* cited by examiner

*Primary Examiner* — Mustafa Iqbal
(74) *Attorney, Agent, or Firm* — Sheridan Ross P.C.

(57) ABSTRACT

A communication between parties over a network may be performed to complete a specific workflow and thereby complete a task. Portions of the workflow may be performed during the communication and others performed after the communication has ended. However, a standardized workflow may have variations, such as when portions to complete after the call has ended may have been completed during the communication or when an agent provides additional or alternative tasks. By analyzing the conversation, such as with a neural network or other artificial intelligent system, the portion of the second workflow to be completed after the communication has ended may be produced that accurately reflects the tasks to be completed.

20 Claims, 7 Drawing Sheets

DYNAMIC GENERATION OF CUSTOM POST-CALL WORKFLOW

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for the generation of workflows and particularly to automatic customized workflows.

BACKGROUND

During a call with an agent, a customer may provide and receive information to resolve a particular issue. There may be a particular workflow associated with the issue. The workflow may comprise tasks to be performed by the customer after the call has concluded. It is also possible that the agent provided information that is not part of the standard workflow, such as some direct contact numbers, links, tips, process, notes, etc. based on the agent's own capability or knowledge, that the agent believes will be helpful to the customer in performing the post-call tasks. It is assumed, perhaps incorrectly, that the customer accurately and completely recorded the post-call workflow instructions.

Additionally, there may be tasks of the standard post-call workflow that have been taken out of turn and already been performed, such as during the call itself. The customer may be confused by the redundant task and waste resource performing the task again. For some workflows, tasks may be required to be performed only once. Repeating a task may introduce errors.

SUMMARY

Contact centers often provide instructions to a customer during a communication, such as a voice call. The instructions may be to perform a task (e.g., buy an insurance policy, make travel arrangements, resolve a technical issue, etc.) or provide information (e.g., the maximum amount the customer may borrow). A series of tasks may be embodied in a workflow and comprise tasks. The tasks may be separated by the person or entity performing the tasks, which may include agent tasks (e.g., gather basic information, provide certain information, etc.) and customer tasks (e.g., submit a notarized form, provide income statements, etc.). As a matter of practicality and/or performance, the communication cannot be maintained until all tasks are complete. For example, waiting for a customer to locate a document may take a few seconds or days. If the task cannot be performed quickly, other tasks may be performed, and the customer provided with a workflow comprising the tasks to be performed after the call has ended.

Prior art systems provide a standard library of post-call workflow. The standard library of workflow tasks may identify all tasks, including tasks that have already been performed or for tasks that do not apply to the particular situation of the customer. For example, a workflow task may assume that customers do not have a particular document readily available. However, if a customer does have the document available and has provided the document to the agent or system, the workflow task may still show the document as being required in a later task of the workflow. The post-call workflow execution success depends on how clearly a customer understands and captures the critical post-call execution flow instructions and/or how well the agent provides accurate and complete instruction to the customer.

These and other needs are addressed by the various embodiments and configurations of the present invention. The present invention can provide a number of advantages depending on the particular configuration. These and other advantages will be apparent from the disclosure of the invention(s) contained herein.

In one embodiment, a machine-based artificial intelligent (AI) system is provided to generate a simplified, targeted, custom, dynamic post-call job workflow where the branch selection is done on the basis of decision-making responses provided by the customer to the agent.

Customer provided information may be collected during the call and utilized as an input to the generation of post-call workflow comprising tasks selected in accordance with the information collected during the call. As a result, the engagement time required with the agent is reduced. The customer may also revisit any decision by listening to a recording of the conversation with the agent at the node where a particular post-call task was determined to be necessary.

In one embodiment, while a customer is engaged with an agent and discusses a particular issue, a system monitors the conversation. The monitoring may be provided by an AI trained model to look for particular information. The information may be decision making within the conversation or where the agent provided on-the-fly information that was not part of the standard library for post-call workflow, such as the contact information for an important person to utilize if additional support is needed for a particular node (e.g., a representation of a task) of the workflow. Other information that the agent may provide, which is not part of the standard workflow and detected by the monitoring system, may include, reference links, processes, tips, or designated departments provided from the agent's own skill rather than from the on-call workflow. When a customer responds to the agent query, if the response has a potential to influence the post-call workflow, the AI based system captures the information such as to record the conversation and/or mark the start/end time of a recording as per the matched AI trained model.

Once the live call has concluded, the system loads a standard library of post-call workflow tasks. The system will scan the loaded workflow and perform macro expansion using the captured conversation context information. Once the pre-processing is completed post-call workflow optimization is performed using the decision-making captured information from the conversation. This removes the unnecessary standard library workflow branched and retains only the required workflow branch as per the customer's conversation.

In another embodiment, the system checks if any linking is needed with any other library workflow or some previously generated customized post-call workflow. Finally, after compilation of the loaded standard flow, a targeted customer centric dynamic post-call workflow is generated for the execution.

In another embodiment, such as to maintain the authenticity of the generated post-call work flow the decision-making nodes is backed by the piece of the conversation recording from the entire engagement recording against the captured start and end time stamp. This will be helpful when customer wants to back track the workflow where workflow branch selected due to customer's provided response against the asked query.

In another embodiment, the target customer post-call workflow is uploaded onto a server for access by the customer, such as while executing the post-call tasks. Workflow once pull on the local device it can set notification/alarms for each targeted post-call actions in terms of date of completion, validate the result of the executed action.

As an example, a customer contacts a call center for an insurance claim. The customer is connected to an agent and explains the scenario of how the accident happened and responds to the agent's questions. During the conversation customer gives information if it is a Federal or Non-Federal claims. Here the AI system is triggered and captures the context of the conversation, the start and end times, questions, responses, and identifies this segment of the interaction as a decision node.

As the conversation continues, the agent provides some information like insurance company's contact person name, contact number, department to get updates etc.—information that is not part of the standard workflow. The system will again capture this info as metadata for the nodes. After the call ends, a standard library workflow is loaded, such as comprising 20 tasks to process the claim. However, the AI now maps captured information with the trained model and starts compiling the loaded workflow to generate a targeted, customer specific post-call workflow with simplified tasks to only required tasks yet to performed.

Optionally, the decision node and/or the corresponding conversation may be entered into a blockchain ledger to preserve an immutable record of the interaction.

In one embodiment, a system is disclosed, comprising: a processor, the processor further comprising machine-readable instructions maintained in a non-transitory storage; and a data storage; a network interface to a network; and wherein the processor: accesses a workflow data structure maintained in the data storage and comprising tasks required to complete a first workflow and thereby complete a purpose for the first workflow, wherein the tasks comprise a first order of the tasks; monitors a communication on the network, via the network interface, wherein the communication comprises a customer, utilizing a customer communication device, and an agent, utilizing an agent communication device each communicating via the network; analyzes the communication to determine a completion status for the tasks; and produces a second workflow comprising the tasks that have not been complete to be performed after the communication has ended and thereby complete the first workflow.

In another embodiment, a method is disclosed, comprising: accessing a workflow data structure maintained in a data storage and comprising tasks required to complete a first workflow and thereby complete a purpose for the first workflow, wherein the tasks comprise a first order of the tasks; monitoring a communication on a network, via a network interface, wherein the communication comprises a customer, utilizing a customer communication device, and an agent, utilizing an agent communication device each communicating via the network; analyzing the communication to determine a completion status for the tasks; and producing a second workflow comprising the tasks, that are not complete, to be completed and thereby complete the first workflow after the communication has ended.

In another embodiment, a server is disclosed, comprising: a processor, the processor further comprising machine-readable instructions maintained in a non-transitory storage; and a data storage; a network interface to a network; and wherein the processor: accesses a workflow data structure maintained in the data storage and comprising tasks required to complete a first workflow and thereby complete a purpose for the first workflow ask, wherein the tasks comprise a first order of the tasks; executes a listening application comprising an artificial intelligent (AI) agent monitoring a communication on the network, via the network interface, wherein the communication comprises a customer, utilizing a customer communication device, and an agent, utilizing an agent communication device each communicating via the network; the AI agent then analyzing the communication to determine a completion status for the tasks; and the AI agent then producing a second workflow comprising the tasks that are not complete, to be performed to complete the first workflow after the communication has ended.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
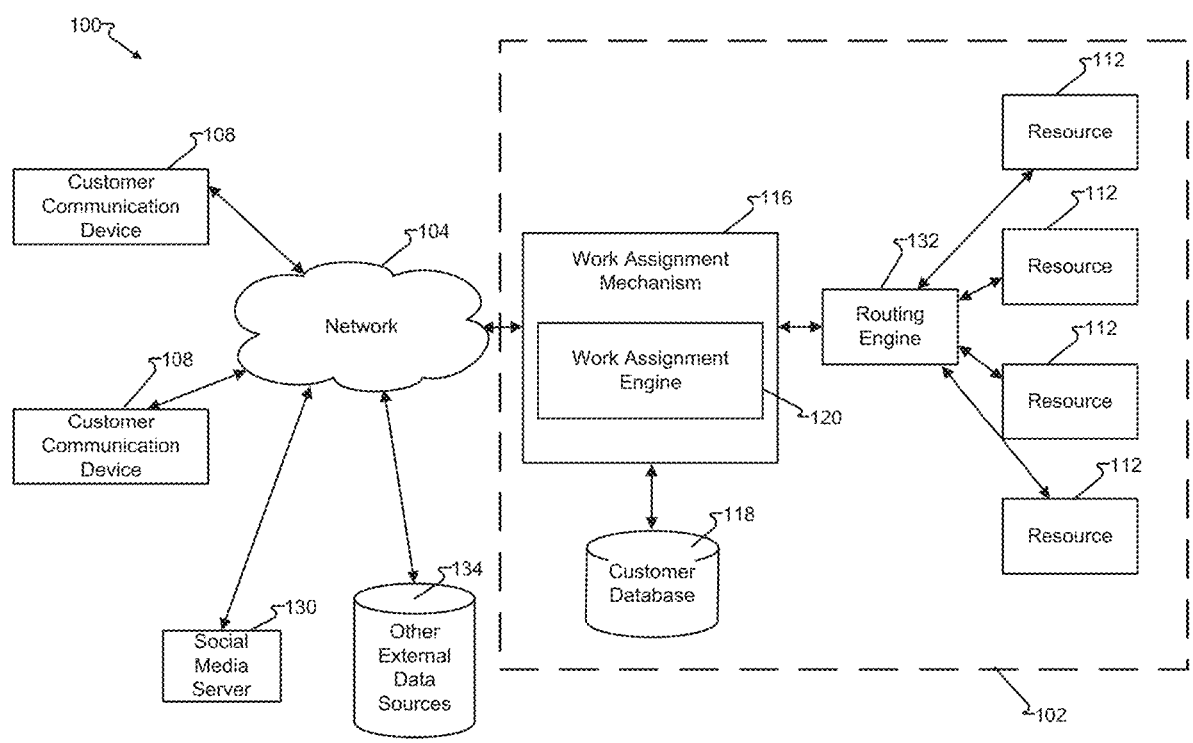
FIG. 1 depicts a first system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
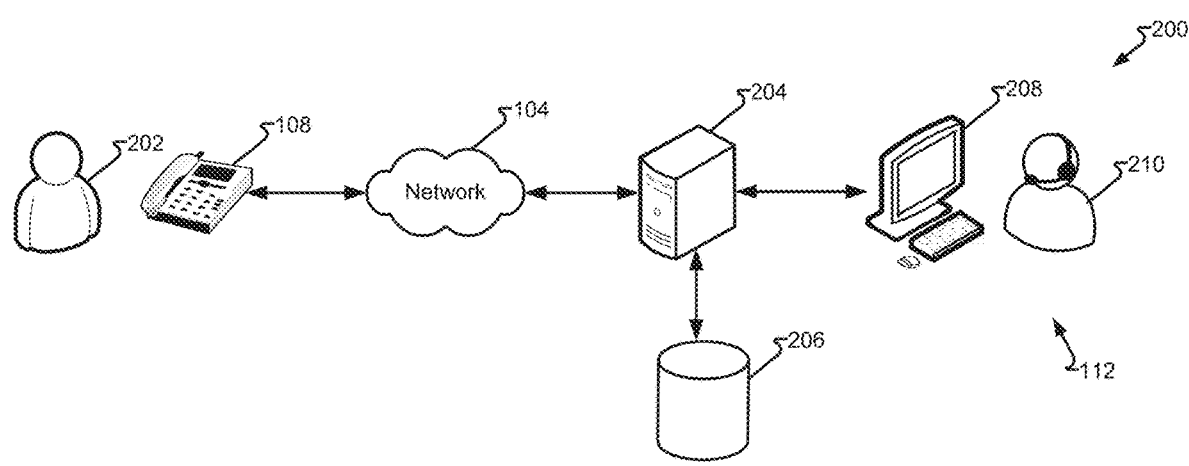
FIG. 2 depicts a second system in accordance with embodiments of the present disclosure.

FIG. 2 depicts system 200 in accordance with embodiments of the present disclosure. In one embodiment, system 200 illustrates a portion of system 100, wherein portions are omitted to avoid unnecessarily complicating the figure and associated description. In one embodiment, customer 202 is engaged in a communication with resource 112, such as agent 210 utilizing agent communication device 208 to perform a task having an associated workflow comprising a set of tasks that, when complete, complete the purpose for the workflow. In one embodiment, the communication may be voice communication. Additionally or alternatively, the communication may comprise text and/or video. A task may be variously embodied and may be generally associated with a business task such as one or more of completing an application process, obtaining technical assistance, etc. Herein, a workflow comprises a data structure with at least two tasks, one task to be completed while customer 202 and agent 210 are engaged in the communication, and at least one task to be completed by customer 202 after the communication has ended. Wherein a "task" comprises a data structure for a granular activity to be performed by an actor, such as at least one of customer 202, agent 210, an AI agent, a processing system, other party, etc. In another embodiment, a task data structure may comprise a sub-task data structure.

In another embodiment, server 204 comprises at least one microprocessor (or, more simply, "processor") configured with machine-readable instructions and/or circuitry to cause server 204 to execute a listener application. The listener application comprises an AI to determine if the communication comprises content that alters the workflow. If such an alteration is provided, the listener application modifies the workflow accordingly. The modified workflow may comprise additional, fewer, alternative tasks, and/or tasks performed in a different order that, when complete, complete the workflow and thereby complete the original task.

As customer 202 and agent 210 communicate, a standard workflow comprising a number of tasks in a first order may be processed by customer 202 and/or agent 210. The workflow may be maintained in data storage 206 or other data storage accessible to agent 210, via agent communication device 208, and server 204. The standard workflow may comprise a number of tasks that cannot be performed, or cannot effectively or efficiently be performed, while the communication is ongoing. For example, one task of a standard workflow may require customer 202 to perform an act or obtain information that is not readily available and, therefore, is designated to be performed after the communication with agent 210 has ended.

In another embodiment, server 204, such as when executing an AI agent, similarly has access to the standard workflow maintained in data storage 206. While the communication is ongoing, server 204 may determine that the standard workflow does not accurately reflect what tasks need to be performed after the communication has ended. For example, agent 210 may be assisting customer 202 in applying for a loan or performing other financial tasks and instruct customer 202 to obtain tax statements for the last five years. In the standard workflow, this would be performed after the communication has ended as customers typically need time to find or otherwise obtain the required information. However, server 204 may be monitoring the communication, such as to hear customer 202 say, "I have that information with me right now." Alternatively, agent 210 may say, "Since you have all your documents, let's get that information." The specific phrasing may be determined by trained neural network, as will be discussed more completely below. Accordingly, server 204 may omit a, "get gross income for last five years," task from a set of post-communication task and/or mark such a task as complete.

As referenced above, and in one embodiment, a machine learning model may be provided to identify content of a communication (e.g., spoken, typed in a text-chat, etc.) that indicates an particular task should be added, removed, altered, and/or reordered from the standard workflow tasks and the order of such tasks. The machine learning model can constantly improve functions for routing the communication sessions in the contact center 102. The machine learning model can be or may include any learning algorithm(s), such as, a linear regression algorithm, a logistic regression algorithm, a decision tree algorithm, a Naïve Bayes algorithm, a K-means algorithm, and/or the like.

In another embodiment, an artificial intelligence (AI) model, such as a neural network, is trained and utilized to support the listener application. Training may include a training dataset comprised of multiple work phrases that depict task requirements and/or completion states for one or more tasks of a workflow (e.g., variations of references to tasks that do and do not affect the completion, addition, modification, reordering, variations of reference to tasks). The training process may incorporate explicit human feedback indicating correct or incorrect determinations made by the AI system.

As a result, a post-communication workflow may be generated to comprise tasks different from the post-communication workflow tasks of a standard workflow. Customer 202 then accesses the generated post-call workflow and completes the tasks identified to satisfy the standard workflow even with different tasks and/or task order.

Figure 3:
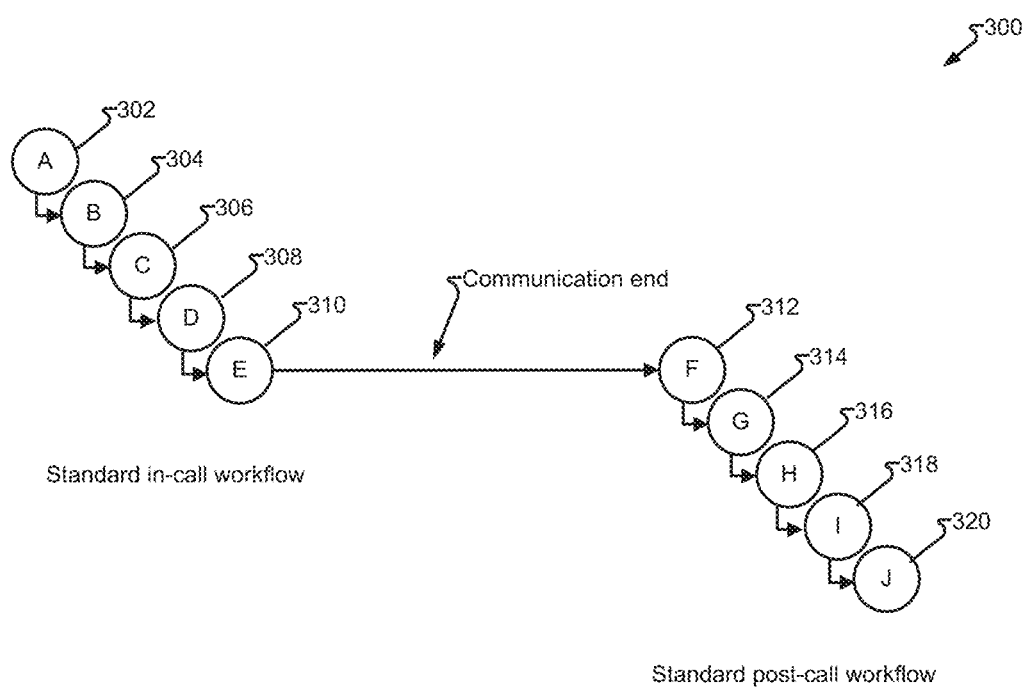
FIG. 3 depicts a first workflow in accordance with embodiments of the present disclosure.

FIG. 3 depicts workflow 300 in accordance with embodiments of the present disclosure. In one embodiment, workflow 300 comprises a number of tasks 302-320, such as maintained in data storage 206 as a standard workflow. During a communication, customer 202 and agent 210 are expected to complete tasks 302-310, terminate the communication, and then customer 202, without the aid of agent 210, completes tasks 312-320. Steps 302-320 may have a strict order, in one embodiment, wherein completion of a subsequent task cannot be attempted until all preceding tasks are complete. In other embodiments, the order is a suggested order.

Figure 4:
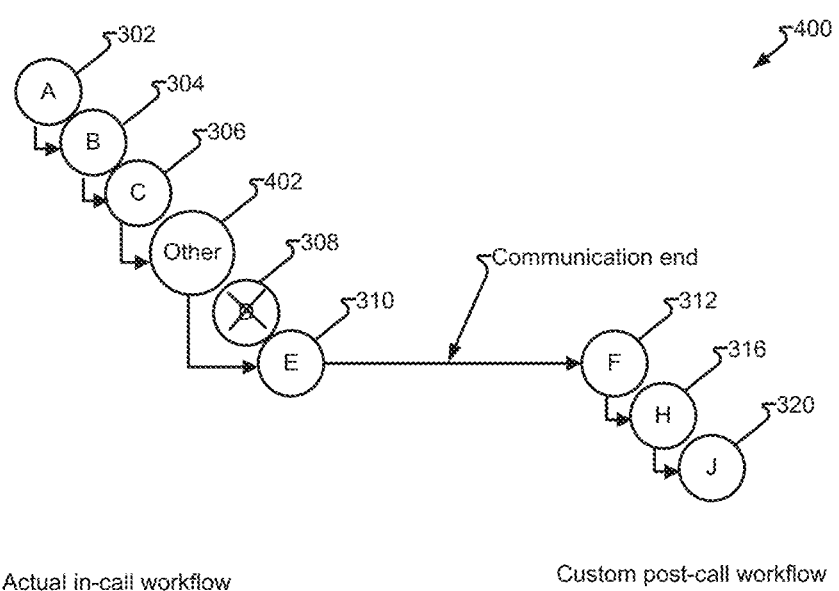
FIG. 4 depicts a second workflow in accordance with embodiments of the present disclosure.

FIG. 4 depicts workflow 400 in accordance with embodiments of the present disclosure. In another iteration of a standard workflow (see FIG. 3), customer 202 and agent 210 perform tasks 302, 304, and 306. However, agent 210 may have expertise to suggest an alternative workflow and/or customer 202 may be able to complete a post-communication task (e.g., tasks 312-320) during the communication. For example, step 402 may be embodied as tasks 308, 314, and 318 and completed during the communication. Server 204, listening to the communication, may then determine that tasks 308, 314, and 318 are complete and omit such tasks from the post-communication workflow. In another embodiment, step 402 may determine that an in-call task, such as task 308 has been completed or is otherwise determined to be unnecessary and omitted from the in-call workflow.

Figure 5:
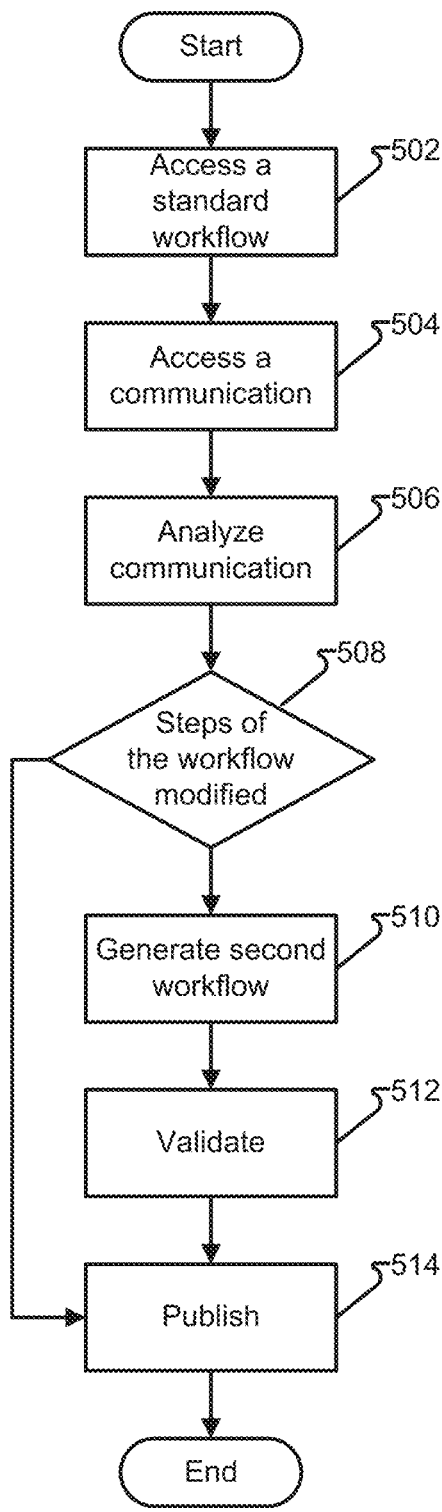
FIG. 5 depicts a first process in accordance with embodiments of the present disclosure.

FIG. 5 depicts process 500 in accordance with embodiments of the present disclosure. In one embodiment, process 500 may be embodied as machine-readable instructions to cause a processor, such as a processor of server 204, to carry out the steps of process 500. Process 500 begins and, at step 502 accessing a standard workflow, such as maintained in data storage 206. Next, step 504, accesses a communication. The communication may be currently ongoing and occurring in real-time, ongoing but delayed, or after the communication has terminated. The communication is analyzed in step 506, such as by a listener application, which may be an AI agent based on machine-learning, neural network, or other machine intelligence to determine if anything in the communication affects the need for a subsequent workflow task to be modified. If test 508 is determined in the negative, then the post-communication workflow may be the standard post-communication workflow. However, if the workflow tasks have been modified, as determined from the content of the communication, wherein test 508 is determined in the affirmative processing continues to step 510. Step 510 generates a second workflow comprising tasks that are yet incomplete and may represent additional, fewer, alternative, and/or reordered tasks from the standard workflow.

In another embodiment, following step 510 a validation may optionally occur in step 512, such as an evaluation by a second artificial intelligent agent and/or a human, such as agent 210. If validation step 512 reveals an error or other defect, the generated post-communication workflow may be omitted and the standard post-communication workflow utilized and/or the error or other defect may be manually corrected. Next, step 514 publishes the generated post-communication workflow, such as to a website or other means accessible to customer 202 to complete the remaining tasks required of customer 202. Additionally or alternatively, step 514 may publish the post-communication workflow to a blockchain ledger.

Figure 6:
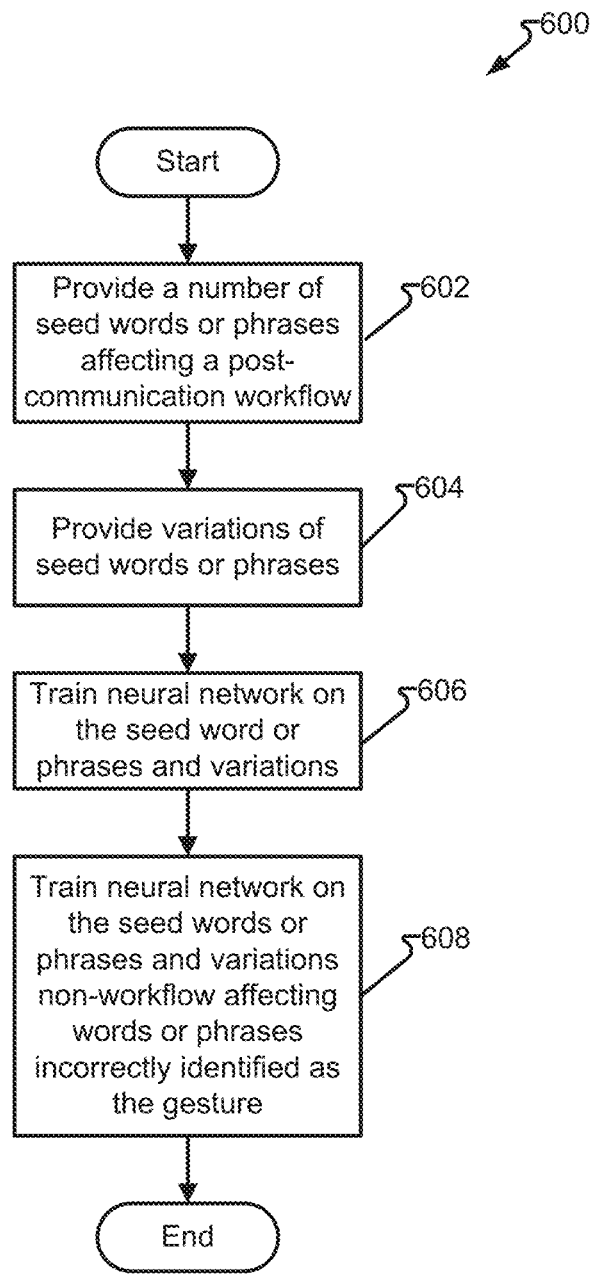
FIG. 6 depicts a second process in accordance with embodiments of the present disclosure.

FIG. 6 depicts process 600 in accordance with embodiments of the present disclosure. Humans are imprecise mechanism to reproduce a particular phrase or word order to communicate a task that should be completed, may be completed, may be helpful, should be completed now versus later, should be completed later versus now, should be performed in a different order, should be omitted, etc. As an exact match to a previously determined phase is unlikely to be produced, a substantial match of a current phrase to corpus or model of a phrases is provided, such as via evaluation by a trained neural network.

A neural network is provided, such as one or more processes embodied as machine-readable instructions maintained in a non-transitory memory and executed by a processor(s) of agent communication device 208, server 204, and/or other processing device(s) able to monitor a communication between customer 202, utilizing customer communication device 108, and agent 210, utilizing agent communication device 208. The neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training task or tasks. Multiple inputs into a node produce a multi-dimensional plane (e.g., hyperplane) to delineate a combination of inputs that are active or inactive.

By way of example, a first layer of nodes may evaluate a phrase for particular words, when a particular work is detected, the nodes provide an input to a next layer of nodes. The next layer of nodes may look for word combinations, such as to determine if a phrase is referencing a particular task. Again, the nodes that find a target combination are active and provide an input to a next layer of nodes which may then look for a purpose or other features. The process continues until a conclusion is reached that a standard workflow should not be used post-communication and, in its place, a workflow is generated comprising only yet to be completed tasks and/or tasks to satisfy the workflow and the purpose for the workflow. As a further embodiment, a particular state update may be determined (e.g., a task may be complete during the communication even though the tasks are scheduled for completion by customer 202 alone after the communication has ended).

Accordingly, and in one embodiment, task 602 provides a number of seed words or phrases affecting a post-communication workflow to a neural network. For example, a particular phrase such as, "let's take care of those documents now," "You should call the department manager as soon as you start the task A rather than waiting until it is needed in task C," etc. The seed word or phrases may be provided by agent 208, who will then provide the words or phrases to indicate a change in state (e.g., complete/not complete), order, omission, or insertion. Task 604 provides a number of variations on the words or phrases that are synonymous with adding, omitting, reordering, or altering a task. For example, "Don't call the main number on the task, call the department manager," "call 800-555-1234 and not the number they give you," "If you want to make this a lot easier, call Alice instead of that 800 number," etc. The variations may include one or more of synonymous words or phrases. With the seed word or phases and variations of the seed word or phrases, task 606 performs a first training action on the neural network.

As a result of the task 606 one or more words or phrases may incorrectly identify a modification to a post-communication workflow tasks. Accordingly, task 608 provides a second training task comprising the seed words or phrases from task 602, the variations provided in task 604, and a number of non-workflow affecting words or phrases that were incorrectly identified as workflow affecting words or phrases in task 606. As a result, the neural network executing on server 204 and/or other computing platform may determine one or more tasks that need to be added, removed, altered, or reordered from the standard workflow tasks.

Figure 7:
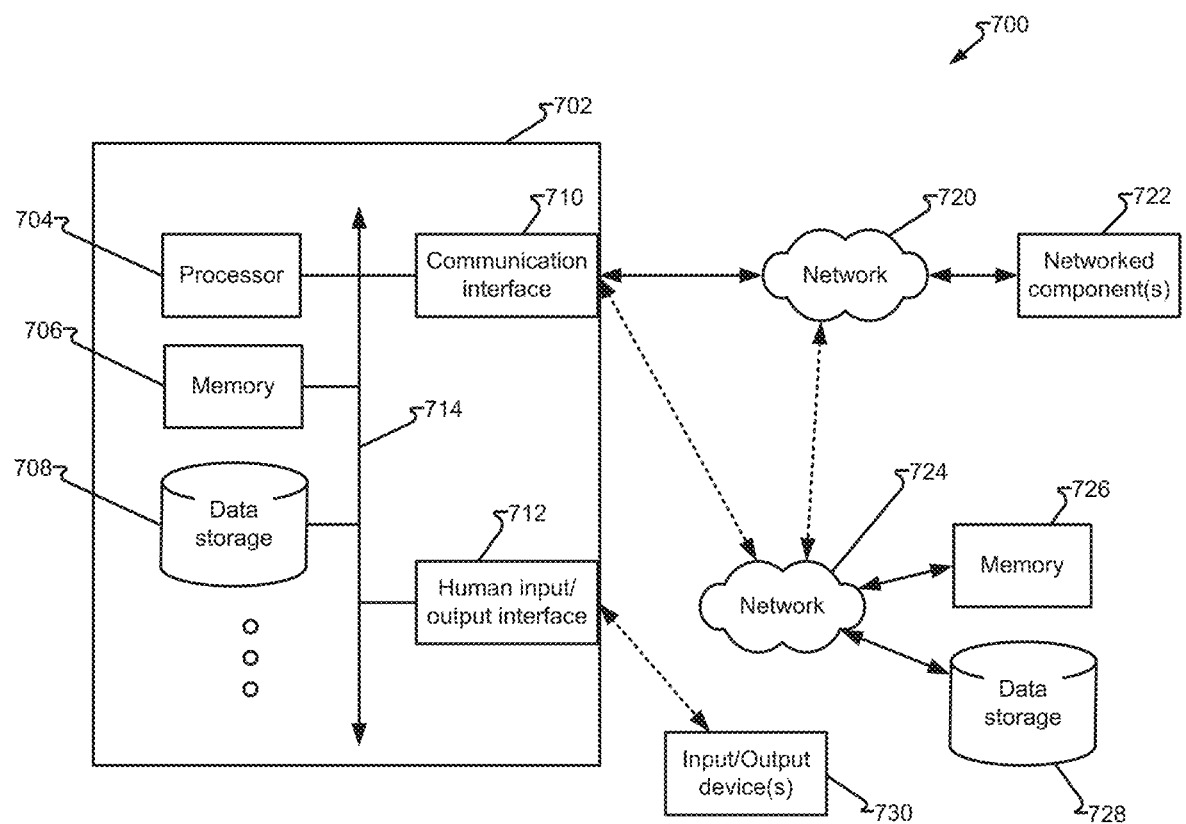
FIG. 7 depicts third system in accordance with embodiments of the present disclosure.

FIG. 7 depicts device 702 in system 700 in accordance with embodiments of the present disclosure. In one embodiment, server 204 and/or agent communication device 208 may be embodied, in whole or in part, as device 702 comprising various components and connections to other components and/or systems. The components are variously embodied and may comprise processor 704. The term "processor," as used herein, refers exclusively to electronic hardware components comprising electrical circuitry with connections (e.g., pin-outs) to convey encoded electrical signals to and from the electrical circuitry. Processor 704 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 704). Processor 704 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, etc. In another embodiment, communication interface 710 may comprise, or be comprised by, human input/output interface 712. Communication interface 710 may be configured to communicate directly with a networked component or utilize one or more networks, such as network 720 and/or network 724.

Network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with network component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing steps and/or shared or distributed processing steps. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIV1926EJS™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared step and/or an allocated step). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a processor, the processor further comprising machine-readable instructions maintained in a non-transitory storage;
a data storage;
a network interface to a network; and
wherein the processor:
    accesses a workflow data structure maintained in the data storage and comprising a plurality of tasks required to complete a first workflow and thereby complete a purpose for the first workflow, wherein the plurality of tasks comprise a first order of the plurality of tasks;
    monitors content of a communication on the network, via the network interface, with a machine learning model and wherein the communication comprises a customer, utilizing a customer communication device, and an agent, utilizing an agent communication device, each communicating via the network; and
    upon the machine learning model determining that the content comprises a decision-making response:
        analyzes the communication to determine a completion status for each of the plurality of the tasks;
        produces a second workflow comprising ones of the plurality of tasks that have not been completed to be performed after the communication has ended and thereby complete the first workflow; and
        provides feedback to the machine learning model comprising an indicator of correctness of the second workflow.

2. The system of claim 1, wherein the first workflow comprises the first order of the plurality of tasks and wherein a first subset of the plurality of tasks are designated to be performed during the communication and a second subset of the plurality of tasks are designated to be performed after the communication has ended.

3. The system of claim 2, wherein the processor produces the second workflow and further comprises producing the second workflow to include at least one task of the first subset of the plurality of tasks.

4. The system of claim 2, wherein the processor produces the second workflow and further comprises producing the second workflow to omit at least one task of the second subset of the plurality of tasks.

5. The system of claim 4, wherein the processor produces the second workflow and further comprises producing the second workflow to omit the at least one task of the second subset of the plurality of tasks, upon determining the at least one of the plurality of tasks has been performed during the communication.

6. The system of claim 2, wherein the processor produces the second workflow and further comprises producing the second workflow to include at least one additional task upon determining the communication comprises an instruction from the agent to the customer to perform the at least one additional task.

7. The system of claim 2, wherein the processor produces the second workflow and further comprises producing the second workflow to omit at least one of the plurality of tasks upon determining the communication comprises an instruction from the agent to the customer to omit the at least one of the plurality of tasks.

8. The system of claim 1, wherein the processor analyzes the communication further comprising the processor executing the machine learning model comprising a neural network trained to recognize that the communication comprises a content and wherein the content is further determined to indicate an additional task is required and, in response, produces the second workflow to add the additional task to the second workflow.

9. The system of claim 1, wherein the processor analyzes the communication further comprising the processor executing a neural network trained to recognize that the communication comprises a content and wherein the content is further determined to indicate one of the plurality of tasks has been completed out of order from the first order and, in response, produces the second workflow to omit the one of the plurality of tasks from the second workflow.

10. The system of claim 1, wherein the processor, upon receiving a validation signal from the agent communication device, makes the second workflow available to the customer communication device.

11. A method, comprising:
 accessing a workflow data structure maintained in a data storage and comprising a plurality of tasks required to complete a first workflow and thereby complete a purpose for the first workflow, wherein the plurality of tasks comprise a first order of the plurality of tasks;
 monitoring content of a communication on a network, via a network interface, with a machine learning model and wherein the communication comprises a customer, utilizing a customer communication device, and an agent, utilizing an agent communication device, each communicating via the network; and
 upon the machine learning model determining that the content comprises a decision-making response:
  analyzing the communication to determine a completion status for each of the plurality of tasks;
  producing a second workflow comprising the plurality of tasks, that are not complete, to be completed and thereby completing the first workflow after the communication has ended; and
  providing feedback to the machine learning model comprising an indicator of the correctness of the second workflow.

12. The method of claim 11, wherein the first workflow comprises the first order of the plurality of tasks and wherein a first subset of the plurality of tasks are designated to be performed during the communication and a second subset of the plurality of tasks are designated to be performed after the communication has ended.

13. The method of claim 12, wherein producing the second workflow further comprises producing the second workflow to include at least one task of the first subset of the plurality of tasks.

14. The method of claim 12, wherein producing the second workflow further comprises producing the second workflow to omit at least one task of the second subset of the plurality of tasks.

15. The method of claim 14, wherein producing the second workflow further comprises producing the second workflow to omit at least one task of the second subset of the plurality of tasks, upon determining the at least one task of the second subset of the plurality of tasks has been performed during the communication.

16. The method of claim 12, wherein producing the second workflow further comprises producing the second workflow to include at least one additional task upon determining the communication comprises an instruction from the agent to the customer to perform the at least one additional task.

17. The method of claim 12, wherein producing the second workflow further comprises producing the second workflow to omit at least one of the plurality of tasks upon determining the communication comprises an instruction from the agent to the customer to omit the at least one of the plurality of tasks.

18. The method of claim 11, wherein analyzing the communication further comprises executing the machine learning model further comprising a neural network trained to recognize that the communication comprises a content and wherein the content is further determined to comprise at least one task of the plurality of tasks that: (a) is needed and, in response, produce the second workflow to add an additional task to the second workflow; (b) has been completed out of order from the first order and, in response, produce the second workflow to omit the one of the plurality of tasks from the second workflow; or (c) is not needed and, in response, produce the second workflow to omit the one of the plurality of tasks from the second workflow.

19. The method of claim 11, further comprising:
 receiving a validation signal from the agent communication device; and
 wherein the validation signal indicates the second workflow is valid, making the second workflow available to the customer communication device.

20. A server, comprising:
 a processor, the processor further comprising machine-readable instructions maintained in a non-transitory storage;
 a data storage;
 a network interface to a network; and
 wherein the processor:
  accesses a workflow data structure maintained in the data storage and comprising a plurality of tasks required to complete a first workflow and thereby complete a purpose for the first workflow ask, wherein the plurality of tasks comprise a first order of the plurality of tasks;
  executes a listening application comprising an artificial intelligent (AI) agent monitoring content of a communication on the network, via the network interface, wherein the communication comprises a customer, utilizing a customer communication device, and an agent, utilizing an agent communication device, each communicating via the network;

upon determining that the content comprises a decision-making response:

the AI agent then analyzes the communication to determine a completion status for the plurality of tasks; and the AI agent then produces a second workflow comprising the plurality of tasks that are not complete, to be performed to complete the first workflow after the communication has ended; and provides feedback to the AI agent comprising an indicator of the correctness of the second workflow.

* * * * *